United States Patent

Breeden

[19]

[11] Patent Number: 4,480,438
[45] Date of Patent: Nov. 6, 1984

[54] POWER TRANSMISSION

[75] Inventor: Robert H. Breeden, Metamora, Mich.

[73] Assignee: Vickers, Incorporated, Troy, Mich.

[21] Appl. No.: 340,980

[22] Filed: Jan. 20, 1982

[51] Int. Cl.³ ............................................. F16H 39/46
[52] U.S. Cl. ........................................ 60/389; 60/444; 60/447
[58] Field of Search ................. 60/443, 444, 452, 445, 60/389, 447; 91/506, 388

[56] References Cited

U.S. PATENT DOCUMENTS

| | | | |
|---|---|---|---|
| 3,606,755 | 9/1971 | Connett | 60/446 |
| 4,118,931 | 10/1978 | Nonnenmacher et al. | 60/444 |
| 4,194,362 | 3/1980 | Nonnenmacher | 60/431 |
| 4,355,506 | 10/1982 | Leonard | 60/452 |

FOREIGN PATENT DOCUMENTS 76573  6/1977  Japan ..................................... 60/452

Primary Examiner—William R. Cline
Assistant Examiner—Randolph A. Smith
Attorney, Agent, or Firm—Barnes, Kisselle, Raisch, Choate, Whittemore & Hulbert

[57] ABSTRACT

A hydraulic system comprising a reversible variable displacement pump, a hydraulic servo motor for controlling the direction and amount of displacement of the pump, a fluid motor connected in parallel to the pump and adapted to be driven by the pump, a pilot operated directional valve for controlling the position and direction of the servo motor system, and a valve for sensing the displacement of said pump and applying a force to the directional valve opposite to the force of the pilot pressure for moving the valve.

7 Claims, 3 Drawing Figures

POWER TRANSMISSION

This invention relates to power transmission in hydraulic systems that are found, for example, on mobile equipment such as excavators and cranes.

BACKGROUND AND SUMMARY OF THE INVENTION

The invention more particularly relates to hydraulic systems for automatic braking at preselected braking pressures of swing drives found, for example, in excavators and cranes. Swing drives are usually comprised of hydrostatic drive having a hydraulic pump and motor, and associated gearing and controls that direct the horizontal rotation of booms found on excavator and cranes.

Swing drive arrangements have utilized the direct control of pressure of fluid being supplied to a motor to control output torque. With output torque control, the operator selects the magnitude and direction of the motor output torque.

Such arrangements typically include a mechanical or electrical control of the direction and magnitude of movement of the valve that controls the swing drive. A typical arrangement is shown in U.S. Pat. No. 3,696,836.

Among the objectives of the present invention are to provide a hydraulic system which is capable of being operated remotely by utilizing a pilot-operated control valve.

Typically, the torque control of swing drive provides free swing or coasting of the boom on cranes. That is, in the absence of a command signal in the hydraulic system, the boom or the boom and load will coast to a stop due to frictional forces without excessive oscillation of the boom cable or the load.

Excavators, are usually arranged with flow control to provide blocked center braking of the boom. That is, the boom or the boom and load will immediately decelerate to a stop in the absence of a command signal. In this case, return flow from the motor is relieved at the motor work port relief valve setting. The blocked center braking allows rapid alignment of the boom and load and also provides for maintaining the boom stationary with the excavator operating on an inclined surface.

It is also desirable, under certain conditions of operation, to brake the swing drive at a preselected reduced pressure; i.e. a pressure setting below the relief valve pressure setting.

It has been found that some operators, who have had their initial training and experience on a free swing braking arrangement on cranes, express a preference for the free swing feature when confronted with the operation of an excavator provided with a blocked center braking arrangement. Conversely, some operators, who have had their initial training on an excavator with the blocked arrangement, express a preference for the blocked center arrangement when confronted with the operation of a crane with a free swing braking arrangement.

In view of the foregoing, it is an object of this invention to provide a hydraulic circuit arrangement for automatic braking at preselected pressures of swing drives wherein an operator may selectively choose, by means of a simple adjustment, a free swing braking arrangement, a blocked center braking arrangement, or reduced pressure braking anywhere between the free swing and blocked center braking arrangements.

Accordingly, there is disclosed herein a selective swing drive automatic braking arrangement for both a torque control hydraulic system and a velocity control hydraulic system.

The hydraulic system comprises a reversible variable displacement pump, hydraulic servo motor means for controlling the direction and amount of displacement of said pump, a fluid motor connected in parallel to said pump and adapted to be driven by said pump, a pilot operated directional valve for controlling the position and direction of said motor system, and means for sensing the displacement of said pump and applying a force to said directional valve opposite the force of the pilot pressure for moving said valve.

More specifically, the torque control hydraulic system arrangement comprises a reversible variable displacement piston pump including a charging stage, a swashplate operable for varying pump displacement, a swashplate stroking cylinder acting against a swashplate biasing cylinder connected to the charging stage for varying the angle of the swashplate, and a swashplate angle feedback valve for sensing the angular movement of the swashplate; a swashplate control valve for controlling fluid flow to the stroking cylinder and including a spring centered differential area spool having first and second large area annuli and first and second opposed small area ends; a hydraulic motor connected in parallel across the pump and to both first and second small area ends of the control valve for supplying the driving torque to the swing drive; a control pressure relief valve connected between tank and the control valve, the charging stage, and the biasing cylinder; a control pressure reducing valve connected in series with the relief valve between tank and the feedback valve and in parallel with the relief valve and the biasing cylinder; and a manually operated hydraulic remote control valve having first and second pilot pressure lines connected to the first and second annuli of the control valve and to the feedback valve through first and second shuttle valves, respectively.

DESCRIPTION

Figure 1:
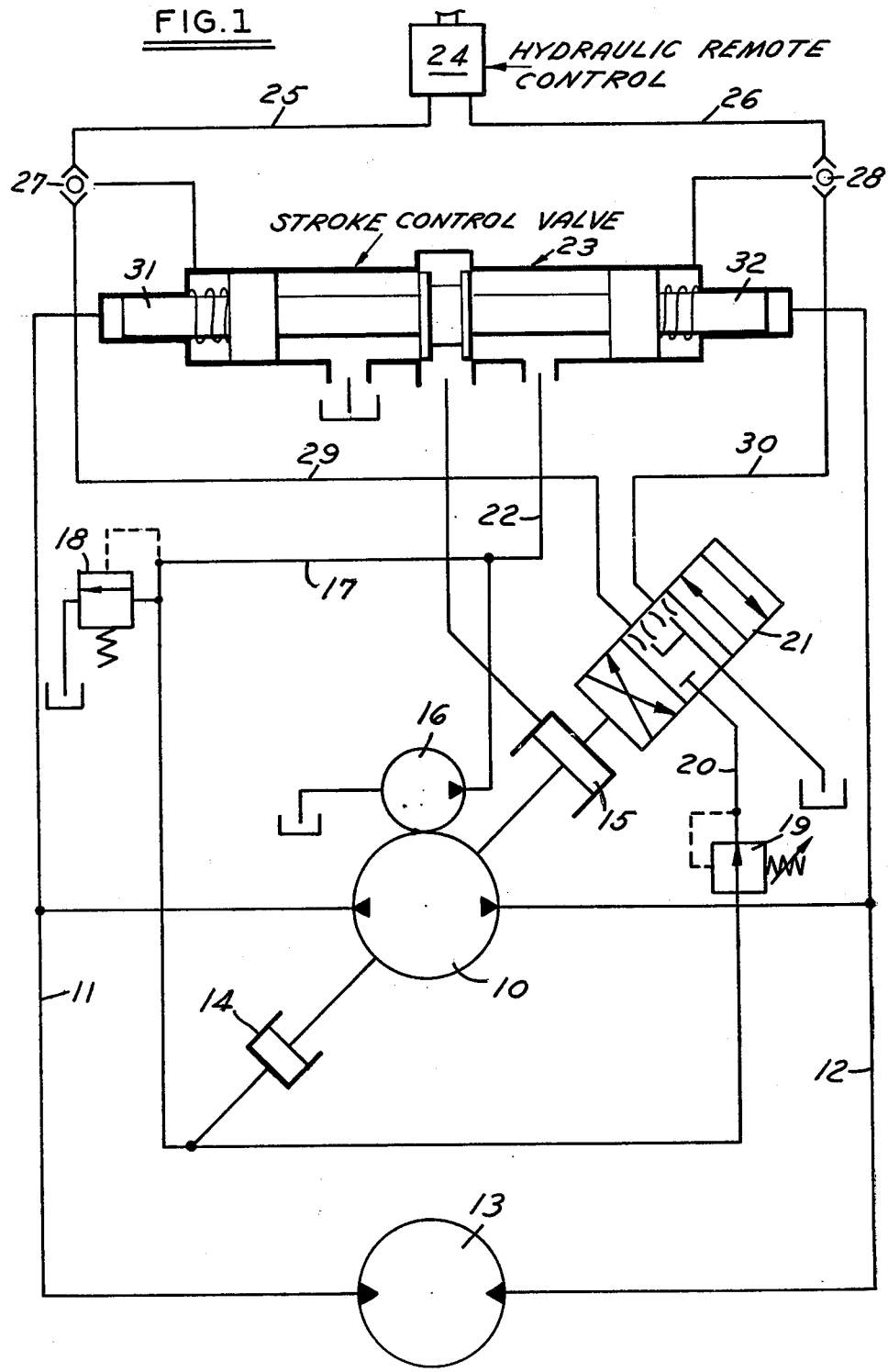
FIG. 1 is a schematic of the hydraulic system embodying the invention.

Referring to FIG. 1, the hydraulic transmission embodying the invention comprises a reversible variable displacement pump 10 connected by lines 11, 12 to a fluid motor 13. The displacement of the pump 10 may be varied by means of a servo motor system of the differential area type comprising a small area piston 14 and a large area piston 15. The variable displacement pump 10 includes a charging and an auxiliary or control pressure fixed displacement pump 16 which delivers fluid through a line 17 and a low pressure relief valve 18 to the small area piston 14 and an adjustable pressure reducing valve 19 that extends through a line 20 to a feedback device 21. The charging and control pressure pump 16 is also connected to a line 22 to a pilot operated directional valve 23 that functions as a stroke control valve, as presently described. The stroke control valve 23 is connected to a manually operated hydraulic remote control valve 24 through lines 25, 26 through shuttles 27, 28 to the opposite ends of the stroke control valve 23 for applying fluid to shift the valve in one direction or the other. The feedback device 21 functions to sense the displacement of the pump 10 and apply a feedback pressure to the control valve 23 opposite to that from the hydraulic remote control. More specifically, the valve 21 functions to direct feedback fluid through lines 29, 30 to the pistons 31, 32 at the opposite ends of the shuttle of the control valve 23.

Figure 2:
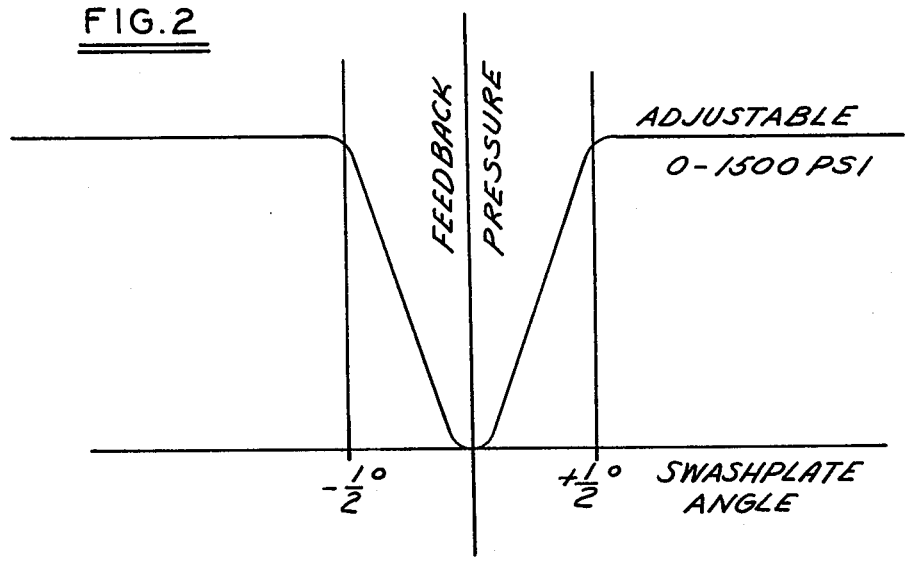
FIG. 2 is a curve of feedback pressure versus displacement of the variable displacement pump.

In neutral, output pressure in both lines from the hydraulic remote control 24 is zero. If there are no overhauling loads on the hydraulic motor, the pressure in both main system legs is also zero. If an overhauling load develops so as to cause a pressure to develop in the right leg of the main circuit, the first reaction would be for the stroke control valve 23 to be shifted to the left, porting control fluid to the larger stroking cylinder 15, thereby, changing the displacement of the pump 10 so as to accept fluid from the right leg of the main circuit. However, the swashplate angle feedback device 21 is arranged so as to develop a feedback pressure which is communicated to the differential area on the left end of the stroke control valve 23. The pressure characteristic as a function of swashplate angle is shown in the curve of FIG. 2.

The force balance of the stroke control valve 23 is such that, when the remote control 24 is centered, the pressure in the main system must exceed a certain preselected value before the pump will be shifted significantly away from neutral by an overhauling load.

In order to swing the load through actuator 13, the remote control 24 is manually deflected from a centered position. This causes pilot pressure to build-up in one of the pilot lines. If, in FIG. 1, pressure is built-up in the left line coming from the remote control 24 the shuttle valve will shift and allow pressure to act on the differential area on the left side of the stroke control valve 23. The stroke control valve 23 is shifted to the right, and the large stroking cylinder 15 is allowed to drain to tank. After a slight movement of the swashplate, the swashplate angle feedback device 21 develops a pressure which is fed through the right shuttle to the differential area on the right side of the stroke control valve 23. This nulls out the stroke control valve 23 and further movement of the remote control 24 is required to increase the pilot command. At some preselected level selected by adjustment of the pressure reducing valve 19, the command pressure will overbalance feedback pressure and the stroke control valve 23 will move to the right and displacement of the pump 10 will cause flow into the right leg of the main system. As a load is encountered, the pressure will act on the small piston on the right end of the stroke control valve 23. A force balance will exist between pilot pressure acting on the differential area on the left side of the stroke control valve 23 and the sum of feedback pressure acting on the differential area and system pressure acting on the piston on the right end of the stroke control valve 23. Pump output pressure, or motor output torque, can thereby be controlled.

If a driven load tends to increase so as to exceed the torque setting, the stroke control valve 23 will shift to the left and reduce the swashplate angle. If the pump approaches neutral, and the driven load does not subside, the feedback pressure will reduce to zero as indicated by FIG. 2. The swashplate will remain at neutral until the pressure builds to the point that the resulting force exceeds that resulting from pilot pressure acting on the differential area on the left side of the stroke control spool 23. As the stroke control valve 23 shifts and tends to carry the swashplate across center, feedback pressure will begin to build-up and be fed to the shuttle valve feeding the differential area on the left side of the stroke control spool 23. As long as it does not exceed pilot pressure, it has no effect.

Assuming that remote control pilot pressure is greater than maximum feedback pressure, the stroke control spool will continue to move to the left and move the pump onto stroke. If the overhauling load continues to increase, the pump will stroke up to full displacement.

In the case where a high inertia load is of a resistive type and the swing has been accelerated up to some speed by applying pilot pressure in the left leg of the remote control, then centering the remote control valve handle, pilot pressure in both lines from the remote control 24 will be zero. The swashplate will have been at an angle so that maximum feedback pressure is acting on the differential area on the right side of the stroke control valve 23. This will cause the stroke control valve 23 to shift to the left and admit control fluid to the large stroking cylinder 15 so that displacement decreases. Pressure will build-up in the left leg of the main system and act on the small piston at the left end of the stroke control valve. A force balance will be established, and the load will be decelerated at a preselected pressure level until the pump reaches neutral.

It can be seen that the system will maintain the swing essentially stationary whenever the overhauling pressure is less than that preselected. Torque to swing the vehicle in either direction can be varied by an operator manually controlling the remote control 24.

If an operator wants to decelerate quicker than normal, he can move the remote control across neutral and develop a higher deceleration pressure. Maximum deceleration pressure will be higher than maximum drive pressure.

Thus the hydraulic system retains the advantages of an output torque control and achieves automatic braking by utilizing the accompanying circuit. An operator utilizes hydraulic remote control 24 to control the swing drive. Moving the remote control 24 from a neutral position commands swing in a given direction. A certain movement of the lever (say 10%–15) is required before flow would be delivered by the pump. After the initial travel, the system provides output torque proportional to lever travel. If the handle is centered from full speed swing, the motor is decelerated to a preselected braking pressure until motion stopped. If a higher rate of deceleration is desired, the remote control can be deflected across center to command torque in the opposite direction.

This provides braking pressure up to the maximum pressure rating, again proportional to the amount of lever motion. Maximum braking pressure is higher than the maximum driving pressure by an amount equal to the preselected braking pressure at neutral handle settings.

Figure 3:
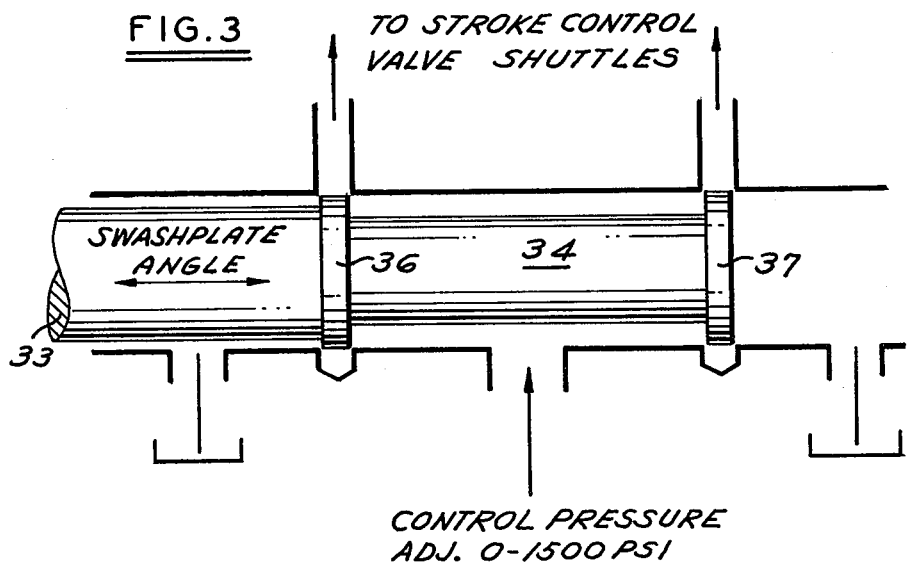
FIG. 3 is a fragmentary cross sectional view of a feedback device utilized in the system.

The swashplate angle feedback device 21 is shown in FIG. 3 and comprises a spool 33 with undercut center 34 and sealing lands 36, 37 oriented at the center position as shown. The spool 33 is positioned axially by the pump stroke mechanism. Sensing holes pick off pressures and feed them to the differential areas of the stroke control valve through lines 29, 30.

As the spool 33 is shifted to the right, control pressure is admitted to the sensing hole on the right. Pressure on the left sensing hole remains at a low value.

If a pure displacement control is desired, the feedback spool can be altered to provide a feedback pressure proportional to pump displacement. By eliminating the small pistons on either end of the stroke control valve, and their communication paths, the system will perform as a pump displacement control similar to that covered by U.S. Pat. No. 3,758,235.

The stroke control valve 23 is essentially like the pilot operated valve of U.S. Pat. No. 3,758,235. The construction preferably is arranged such that from zero to full displacement requires about ½° of swashplate angle movement rather than a greater angle as contemplated by U.S. Pat. No. 3,758,235.

I claim:
1. A hydraulic system comprising
   a reversible variable displacement pump,
   hydraulic servo motor means for controlling the direction and amount of displacement of said pump,
   a fluid motor connected in parallel to said pump and adapted to be driven by said pump,
   a pilot pressure operated directional valve functioning as a stroke control valve for controlling the position and direction of said servo motor system,
   and means for sensing the displacement of said pump and applying a force to said directional valve opposite to the force of the pilot pressure for moving said valve,
   said servo motor means being of the differential area type comprising a small area piston and cylinder and a large area piston and cylinder,
   an auxiliary pump,
   said small area piston being connected to the output of said auxiliary pump,
   said output of said auxiliary pump being also supplied to said stroke control valve,
   said means for sensing the position of said servo motor comprising a feedback valve responsive to the displacement thereof and connected to direct fluid to said stroke control valve for opposing the direction of movement due to pilot pressure.
2. The hydraulic system set forth in claim 1 including a control pressure relief valve connected in series with said last-mentioned directional valve and in parallel with said small area piston and cylinder.
3. The hydraulic system set forth in claim 2 including a manually operated hydraulic remote control for supplying pilot pressure to said directional stroke control valve,
   shuttle valve means in said line to said stroke control valve,
   said feedback valve being connected to said shuttle valve such that the feedback pressure opposes the pilot pressure.
4. A hydraulic system comprising
   a reversible variable displacement piston pump including a charge stage, a swashplate operable for varying pump displacement, a swashplate stroking cylinder acting against a swashplate biasing cylinder for varying the angle of the swashplate,
   a swashplate angle feedback valve for sensing the angular movement of the swashplate,
   a pilot pressure operated directional valve functioning as a swashplate control valve for controlling fluid flow to the stroking cylinder and including a spring centered differential area spool having first and second large area annuli and first and second opposed small area ends,
   said feedback valve being connected to direct fluid to said swashplate control valve for opposing the direction of movement due to pilot pressure,
   an auxiliary pump,
   said biasing cylinder being connected to the output of the auxiliary pump,
   said output of said auxiliary pump being also supplied to said control valve,
   a hydraulic motor adapted to be driven by said pump connected in parallel across the pump and to both first and second small area ends of the control valve for supplying the driving torque to the swing drive.
5. The hydraulic system set forth in claim 4 including a control pressure relief valve connected between the auxiliary pump and the biasing cylinder.
6. The hydraulic system set forth in claim 5 including a control pressure reducing valve that extends between the control valve and the biasing cylinder.
7. The hydraulic system set forth in claim 6 including a manually operated hydraulic remote control valve having first and second pilot pressure lines connected to the first and second annuli of the control valve, first and second shuttle valves, said first and second control lines being connected to the feedback valve through first and second shuttle valves, respectively.

* * * * *